July 28, 1942.  W. A. GRAF  2,290,873

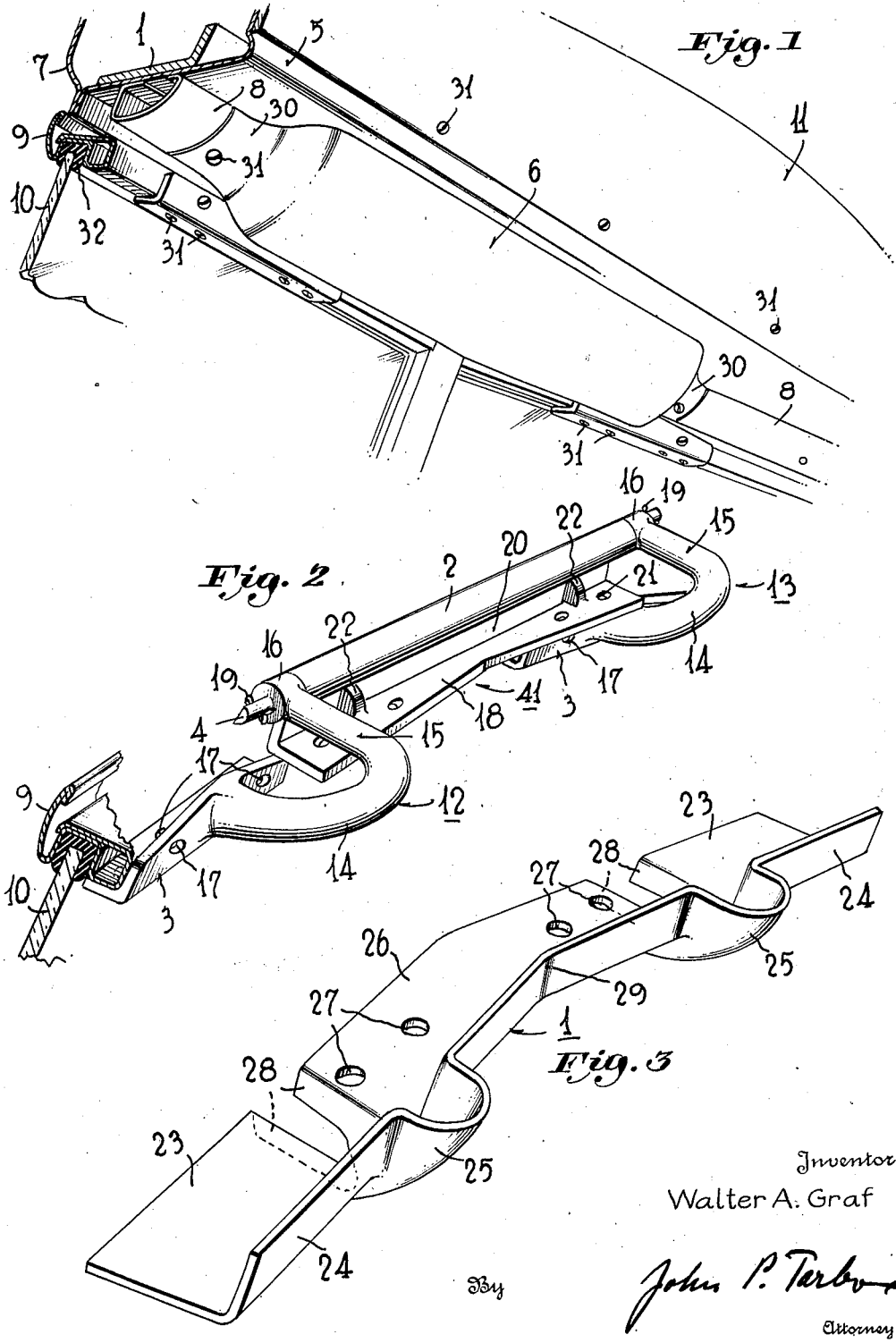

WINDSHIELD SUSPENSION

Filed Aug. 2, 1940  2 Sheets-Sheet 2

Inventor
Walter A. Graf

By John P. Tarbox
Attorney

Patented July 28, 1942

2,290,873

UNITED STATES PATENT OFFICE 2,290,873

WINDSHIELD SUSPENSION

Walter A. Graf, Detroit, Mich., assignor to Edward G. Budd Manufacturing Company, Philadelphia, Pa., a corporation of Pennsylvania Application August 2, 1940, Serial No. 349,460

12 Claims. (Cl. 296—84)

The present invention relates to hinges and similar devices.

An object of the invention is to provide a particular type of hinge which makes possible the opening of a V-type windshield to a horizontal position, and even further if desired.

Due to the angularity of such windshields, ordinary hinges are not very well adapted to use thereon and for this reason the invention contemplates providing a hinge which will afford a secure hold on both panels of the windshield and allow them to swing about a common axis arranged transversely of the car.

The invention also relates to various auxiliary devices for use in connection with the new type of hinge, which contribute to providing such secure hold on the windshield and reinforcing the latter.

In the present case an example of a preferred type of hinge is disclosed, as well as a modified form, the difference between the two residing in that in one form stamped metal is used where in the other form castings are substituted and also that in one form the hinge comprises a single long pintle while in the other form two alined short pintles are provided.

Other objects and advantages of the invention will be specifically pointed out in the present specification and the drawings accompanying the same, while still others will be obvious from the structures disclosed.

In the drawings accompanying the present specification and forming a part thereof, and which are descriptive of a preferred form of the invention and an alternative modification of certain parts thereof:

Fig. 1 is a perspective view of the entire device, certain parts being shown in section and others being partly broken away;

Fig. 2 is a perspective view of the assembled hinge mechanism, a portion of the windshield and its frame also being indicated, to show how the hinge is attached thereto;

Fig. 3 is a perspective view of the windshield header reinforcement which is intended to be secured to the windshield header panel, in order to provide a rigid base for mounting the hinge assembly;

In all the figures similar elements are designated by corresponding reference characters.

Figure 4:
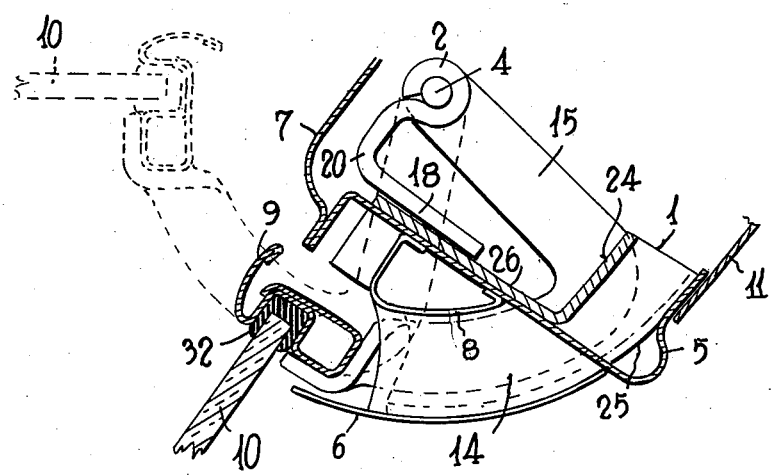
Fig. 4 is a section through the assembly on a plane normal to the hinge pin.

Referring first to Figs. 1 to 4, I designates the windshield header reinforcement which is secured to the windshield header panel 5 in any suitable way, for example by spot welding or the like, and which provides a rigid base for mounting the hinge. It will be noted that this reinforcement 1 is relatively large and may be fastened securely to the panel 5 by means of numerous welds or other fastenings, so that it distributes the stresses over a relatively large surface and affords a much better support than if the hinge wings were secured directly to the panel 5. It will be understood of course that the panel 5 is ordinarily made of relatively light material, so that this reinforcement serves an important function in enabling it to withstand the stresses produced by the weight and motion of the windshield assembly.

Reference to Fig. 2 shows that the hinge here illustrated consists of two substantially quadrant-shaped arms 12 and 13, one at the left and the other at the right of the longitudinal vertical center plane of the vehicle, each arm having an arcuate portion 14 and a radial portion 15, said radial portions terminating in bored lugs 16 which receive the hing pin or pintle 4. At the other end of the arcuate portion of each hinge is a wing 3 of angle-section, having suitable holes 17 in its flanges to receive screws or other securing means for attaching the same to the windshield frame 9.

The hinge pin 4 passes through the tubular portion 2 of the companion hinge member 41 and is held in place in any suitable way, for example by means of cotter pins 19. The hinge bracket has a substantially flat lower flange 18 which may be tapered towards the center from each end, as indicated, and has its other flange 20 bent upwardly and terminating in the tubular portion 2. Suitable holes 21 are provided in the flange 18 for the passage of securing means, and reinforcing ribs or braces 22 may be formed in the angle of the hinge bracket to strengthen the same.

One way of making the assembly particularly rigid is to broach or otherwise shape the holes in the lugs 16 to a non-cylindrical shape, for example a D-shape such as illustrated, to fit the ends of the pin 4, which may in such case be similarly shaped by means of a flat at one side. In this way both the hinge arms 12 and 13 may be maintained in alinement and parallelism with each other, thus contributing to the rigidity of the device while at the same time preventing the lugs 16 from rotating about the pin 4. In other words this construction will force said pin instead to turn with the said hinge sections, thus preventing any wear and looseness, because the wear then will be distributed throughout the relatively long tubular portion 2.

The windshield header reinforcement 1 consists essentially of an "angle-iron" member, bent at its midpoint to provide a V-shape corresponding to the angularity of the windshield, and also having outwardly extending curved portions adapted to accommodate the hinge members 12 and 13, all of which is clearly shown in Fig. 3. In detail, the member 1 comprises a horizontal flange 23, 26 and a vertical flange 24 substantially at right angles to the first-named flange, with outwardly bowed or toroidal portions 25 of proper shape and size to accommodate the respective hinge members 12 and 13, the central portion 26 of the horizontal flange having suitable holes 27 therein to accommodate fastening means.

These holes 27 are spaced to conform with the holes 21 in the flange 18 of the hinge, so that the same fasteners such as screws, bolts, or rivets, may pass through the alined openings to secure these jointly to the windshield header panel 5. It will be noted that down-turned flanges are provided at 28 to form slots for accommodating the hinge members 12 and 13 throughout their motion, and these flanges serve also to stiffen the header reinforcement member 1, as does the bend at 29 in the upstanding flange. Considerable stiffening is also provided of course by the toroidally shaped portions 25 as will be obvious, and the whole member 1 is of such configuration as may be made easily by the customary metal punching and drawing operations.

In order to conceal and protect the hinge mechanism, a suitable hinge trim cover 6 may be provided and placed as shown in Fig. 1, said member 6 preferably having its ends reduced as shown at 30 to conform with the garnish moulding 8. Suitable fastening means, such as screws 31 or the like, may be provided for securing the various elements to the vehicle, as indicated.

In Fig. 4 the relations of the various members are illustrated, the windshield being shown in full lines in its closed position and in dotted lines in its open or horizontal position. This figure clearly shows the relative positions of the roof panel 7 and the header panel 5, with the flange 26 of the header reinforcement member above the same and the flange 18 of the hinge bracket above the flange 26. The windshield glass 10 is mounted in the frame 9 in any suitable way, with a rubber or equivalent moulding 32 interposed to provide a weather-tight slightly yieldable joint.

Figure 5:
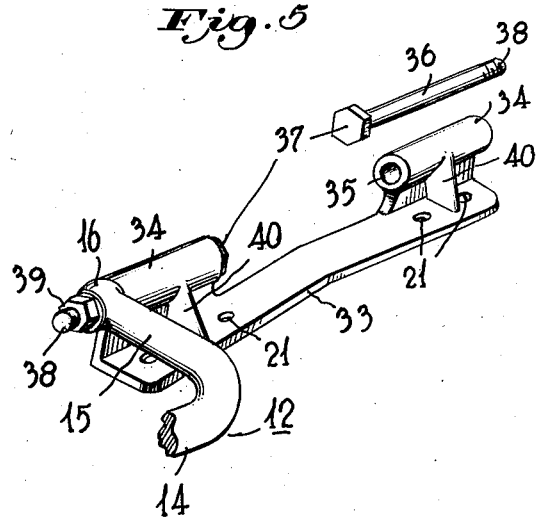
Fig. 5 is a perspective view of a modified form of hinge, which may be substituted for that disclosed in Fig. 2 if preferred.

The modified form of hinge shown in Fig. 5 differs from the previously described form in that a metal casting 33 is substituted for the stamped metal hinge member of Fig. 2, and that two spaced-apart cylindrical or tubular portions 34 replace the single long portion 2 of Fig. 2. These tubular members have a bore 35 adapted to receive the shanks 36 of bolts 37 which jointly serve as a hinge pin. The threaded end 38 of each bolt 37 extends beyond the lug 16 of the corresponding hinge member 12 or 13, and a nut 39 will serve to lock the parts together to permit rotation of the hinge about the axially alined bores 35. Strengthening ribs 40 may be provided to make the casting suitably rigid. In other respects the construction is substantially identical with that already described.

The operation of the invention will be clear from the structures disclosed, and may be summarized briefly as follows.

When the relatively stationary hinge members 41 or 33 are secured to the vehicle body by means of the header reinforcement member 1, a rigid connection is established, which is sufficiently strong to support the weight of the windshield in any position whether the vehicle is at rest or in motion, the purpose of the header reinforcement being to provide a firm support for the hinge and at the same time to distribute the stresses to a relatively large area of the header panel 5.

A stable axis for the windshield is provided by the pin 4 in the one form of the device or by the two alined bolts 37 in the other form, whereby in both cases the arms 12 and 13 of the movable portion are spaced apart a considerable distance transversely of the vehicle. Since the two wings 3 thus also are secured to the windshield frame 9 at a considerable spacing from one another, a very stable joint results, which is resistant to twisting and misalinement, so that a satisfactory pivot for the windshield is thus provided in either case.

The peculiar shape of the arms of the movable hinge portion, namely, a radial portion combined with a substantially quadrant shaped portion, provides suitable clearance for the hinge members and the windshield during its entire pivotal adjustment.

Having disclosed a preferred form of the invention together with a slightly modified type thereof, it will be clearly understood that the forms selected for illustration are given merely by way of example and not as limitations of the scope of the invention which may be modified in many ways, within the spirit of the invention. The scope of the invention is defined solely in the following claims.

I claim:

1. In a vehicle body having a V-type windshield, a hinge for connecting both halves of said windshield to the adjacent portion of the body, said hinge comprising a relatively long bracket extending transversely of the vehicle and across the apex of the V-arrangement, a pair of hinge wings, one at each end of said bracket, said wings having portions extending in the general direction of and being attached to the corresponding half of the windshield, thus supporting said windshield at widely-spaced regions which are on different sides of the apex of the V-arrangement and inclined with respect to one another, and means providing a single axis of rotation in said bracket for both hinge wings.

2. In a vehicle body having a V-type windshield, a hinge for connecting said windshield to a generally horizontally and rearwardly extending portion of the body rail above the windshield opening, said hinge including a relatively long bracket structure extending transversely of the vehicle and across the apex of the V-arrangement, a pair of hinge wings, one on either side of and widely spaced from the apex of the V-arrangement, each one of said wings being attached to the corresponding half of the windshield, thus supporting said windshield at widely-spaced points, and a shaft rotatably mounted in the bracket structure and providing a single axis for the rotation of both hinge wings.

3. In a vehicle body having a V-type windshield, a hinge for connecting both halves of said windshield to the adjacent portion of the body, said hinge consisting of a relatively long bracket extending transversely of the vehicle and across the apex of the V-arrangement, a pair of hinge wings, one at each end of said bracket, said wings being adapted to be attached to the corresponding half of the windshield, a rigid shaft journaled in the bracket, means securing each wing to an end of said shaft to rotate therewith, thus supporting said windshield at points which are widely spaced from and inclined to each other, and providing a single axis in said bracket for the joint rotation of both hinge wings.

4. In a vehicle body having a V-type windshield, a hinge for connecting said windshield to the adjacent portion of the body, said hinge consisting of a relatively long bracket extending transversely of the vehicle, a transverse shaft journaled in said bracket, a pair of hinge wings, one connected by means of said shaft rotatably about a common axis to each end of said bracket and attached to the corresponding side of the windshield, thus supporting said windshield at widely-spaced points, each of said wings comprising an arm having a portion extending generally radially to said shaft and a circumferential portion, the shape of said bracket and the relative arrangement of said bracket and said wing arms being such as to allow said arms to pass the lateral portions of said bracket.

5. A windshield header reinforcement for a hinge for a V-shaped windshield of the type having one hinge wing fastened to either half of the windshield at points widely spaced from the apex of the V-arrangement, said reinforcement comprising an angle-plate having a first arm for overlying the rail of the body above the windshield, and an upstanding second arm at an angle to the first-named arm, said angle plate being bent to conform to the V-shape of the windshield and shaped to accommodate the hinge wings by providing at least one of the arms with outwardly bent portions in the regions of the path of the hinge arms.

6. A windshield header reinforcement for a hinge for a V-shaped windshield of the type having one hinge wing fastened to either half of the windshield at points widely spaced from the apex of the V-arrangement, said reinforcement comprising an angle-plate having a first arm for overlying the rail of the body above the windshield, and an upstanding second arm at an angle to the first-named arm, said angle plate being bent to conform to the V-shape of the windshield, one of the arms having slots and the other arm being outwardly offset in the region of the hinge wings so as to allow the hinge wings to move, the margins of said slots being provided with reinforcing flanges which form continuations of the lateral parts of said offset portions.

7. A windshield header reinforcement for a hinge for a V-shaped windshield of the type having one hinge wing fastened to either half of the windshield at points widely spaced from the apex of the V-arrangement, said reinforcement comprising an angle-plate having a first arm for overlying the rail of the body above the windshield, and an upstanding second arm at an angle to the first-named flange, said angle plate being bent to conform to the V-shape of the windshield and having slots in its first-named flange and portions of its upstanding second arm bent out of the way, to provide room for free movement of the hinge wings.

8. A hinge for connecting a V-type windshield to a vehicle body, the hinge comprising a transversely disposed bracket adapted to be attached to the vehicle body and to extend across the apex of the V-arrangement, and a wing at each end of said bracket pivoted to the latter on a common transverse axis, each wing having an attaching portion disposed below said bracket for connection to and extending in the general direction of the respective windshield portion.

9. A hinge for connecting a V-type windshield to a vehicle body, the hinge comprising a relatively long transversely disposed bracket attachable to the vehicle body so that it extends across the apex of the V-arrangement, a wing at each end of said bracket journaled on the latter on a transverse axis, and an attaching portion on each wing disposed below and extending laterally under said bracket for connection to the windshield.

10. A hinge for connecting a V-type windshield to a vehicle body, the hinge comprising a transversely disposed bracket attachable to the vehicle body so that it extends across the apex of the V-arrangement, a wing at each end of said bracket, pintle means rigid with said wings, means journaling said pintle means on a transverse axis at the upper portion of said bracket, and an attaching portion on each wing disposed below the bracket and extending laterally under the bracket for connection to the windshield.

11. A hinge construction for connecting a V-type windshield to a vehicle body, the hinge comprising a relatively long plate attachable to the vehicle body in a plane approximately at a right angle to the windshield, a relatively long bracket having an attaching portion supported on said plate, bearing means longitudinally of and at the top of said plate, wings generally of U-shape disposed at each end of said bracket, pintle means rigid with the upper terminals of said wings and journaled in said bearing means, said plate having slots accommodating movement of said wings, and portions at the lower terminals of said wings disposed below and extending laterally under said plate having attaching surfaces arranged at an angle with respect to each other for attachment to the windshield.

12. In a vehicle body having a V-type windshield, a hinge for connecting both halves of said windshield to the adjacent portion of the body, said hinge comprising a relatively long shaft, bracket means in which said shaft is journalled, said shaft extending transversely of the vehicle and across the apex of the V arrangement, said bracket means supporting said shaft on both sides of the apex, a pair of hinge wings being attached to said shaft on different sides of the apex and to different halves of the windshield, thus supporting said windshield at points which are widely spaced from and inclined to each other and providing a single axis for the joint rotation of both hinge wings.

WALTER A. GRAF.